United States Patent
Yurchenko (10) Patent No.: US 11,466,400 B2
(45) Date of Patent: Oct. 11, 2022

(54) FINISH COMPOSITION

(71) Applicant: Hexcel Corporation, Dublin, CA (US)

(72) Inventor: Michael E. Yurchenko, Decatur, AL (US)

(73) Assignee: Hexcel Corporation, Dublin, CA (US)

( * ) Notice: Subject to any disclaimer, the term of this patent is extended or adjusted under 35 U.S.C. 154(b) by 0 days.

(21) Appl. No.: 16/407,365

(22) Filed: May 9, 2019

(65) Prior Publication Data

US 2019/0382950 A1  Dec. 19, 2019

Related U.S. Application Data

(60) Provisional application No. 62/743,782, filed on Oct. 10, 2018, provisional application No. 62/686,779, filed on Jun. 19, 2018.

(51) Int. Cl.
| | | |
|---|---|---|
| *C08L 83/08* | (2006.01) | |
| *D06M 15/643* | (2006.01) | |
| *D01F 9/22* | (2006.01) | |
| *D06M 13/17* | (2006.01) | |
| *D06M 13/188* | (2006.01) | |
| *D06M 13/192* | (2006.01) | |
| *D06M 13/203* | (2006.01) | |
| *D06M 13/207* | (2006.01) | |
| *D06M 13/342* | (2006.01) | |
| *D06M 13/355* | (2006.01) | |
| *D06M 13/402* | (2006.01) | |
| *D06M 101/28* | (2006.01) | |

(52) U.S. Cl.
CPC .............. *D06M 15/643* (2013.01); *D01F 9/22* (2013.01); *D06M 13/17* (2013.01); *D06M 13/188* (2013.01); *D06M 13/192* (2013.01); *D06M 13/207* (2013.01); *D06M 13/2035* (2013.01); *D06M 13/342* (2013.01); *D06M 13/355* (2013.01); *D06M 13/402* (2013.01); *C08L 83/08* (2013.01); *D06M 2101/28* (2013.01)

(58) Field of Classification Search
CPC ..................... C09D 183/08; C08L 183/08
See application file for complete search history.

(56) References Cited

U.S. PATENT DOCUMENTS

| | | | |
|---|---|---|---|
| 4,009,248 A | 2/1977 | Kishimoto et al. | |
| 4,894,412 A * | 1/1990 | Okada ................. | B01F 17/0071 524/714 |
| 5,520,827 A * | 5/1996 | Danner ............... | D06M 13/342 106/287.11 |
| 5,571,442 A * | 11/1996 | Masaki ................ | D01F 9/22 106/287.11 |
| 5,573,694 A * | 11/1996 | Danner ............... | D06M 13/342 106/287.11 |
| 5,621,034 A | 4/1997 | Mautner | |
| 5,716,443 A * | 2/1998 | Kijima ................ | C09G 1/16 106/287.11 |
| 5,726,241 A * | 3/1998 | Maruyama ........... | D01F 9/22 106/287.11 |
| 6,451,905 B2 * | 9/2002 | Spyropoulos ......... | C08J 3/03 524/588 |
| 8,852,848 B2 * | 10/2014 | Wu ...................... | G03F 7/405 430/273.1 |
| 8,853,372 B2 * | 10/2014 | Beck ................... | A61K 8/585 536/1.11 |
| 8,986,647 B2 | 3/2015 | Ural et al. | |
| 9,200,384 B2 | 12/2015 | Hashimoto et al. | |
| 9,243,213 B1 * | 1/2016 | Vetter ................. | C11D 3/3742 |
| 9,616,254 B2 * | 4/2017 | Inokuchi ............. | A61K 8/891 |
| 2001/0047052 A1 * | 11/2001 | Spyropoulos ......... | A61Q 19/00 524/588 |
| 2003/0013803 A1 * | 1/2003 | Spyropoulos ......... | C08J 3/03 524/588 |
| 2008/0197315 A1 * | 8/2008 | Schmidt ............. | D06M 15/6436 252/8.91 |

(Continued)

FOREIGN PATENT DOCUMENTS

| | | |
|---|---|---|
| JP | 2007-177349 A | 7/2007 |
| WO | WO 2018/100786 A1 | 6/2018 |

OTHER PUBLICATIONS

WIPO Application No. PCT/US2019/032038, PCT International Search Report and Written Opinion dated Sep. 13, 2019.

(Continued)

*Primary Examiner* — Margaret G Moore
(74) *Attorney, Agent, or Firm* — Alston & Bird LLP (57) ABSTRACT

Provided is a composition for the treatment of fibers, such as PAN precursor fibers. The finish composition includes a polysiloxane; an emulsifier; water; and a dicarboxylic acid having a $pK_a$ from 1 to 4, and boiling point from 200 to 400° C. The dicarboxylic acid may have the following formula:

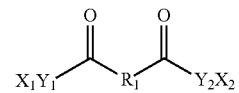

where $R_1$ is absent or a saturated or unsaturated, linear or branched, aromatic substituted or unsubstituted, hydrocarbon group; $Y_1$ and $Y_2$ are independently hydrogen, nitrogen, oxygen, sulfur, phosphorus, $C_1$-$C_6$ alkyl group, or an alkoxy group; and $X_1$ and $X_2$ are independently one or more hydrogen atoms, a metal, a quaternary amine, or a hydrocarbon group having up to 6 carbon atoms, the hydrocarbon group being an alkyl group, an alkylene group, or an aromatic group, which may be branched or linear, and may optionally have one or more heteroatoms selected from the group consisting of nitrogen, oxygen, sulfur and phosphorus.

22 Claims, 1 Drawing Sheet

(56) References Cited

U.S. PATENT DOCUMENTS

| | | | | |
|---|---|---|---|---|
| 2009/0202635 | A1* | 8/2009 | Scott | A61K 9/2072 |
| | | | | 424/468 |
| 2013/0115184 | A1* | 5/2013 | Beck | A61K 8/898 |
| | | | | 424/70.12 |
| 2014/0187649 | A1* | 7/2014 | Tamura | A61K 8/06 |
| | | | | 514/772 |
| 2015/0118320 | A1* | 4/2015 | Inokuchi | A61K 8/0241 |
| | | | | 424/501 |
| 2018/0094213 | A1* | 4/2018 | Schymitzek | C11D 3/001 |
| 2019/0218348 | A1* | 7/2019 | Aydin | C08J 3/03 |
| 2019/0309132 | A1* | 10/2019 | Weiss | C08G 77/38 |

OTHER PUBLICATIONS

Gilbert, A. R. et al., *Transient Catalysts for the Polymerization of Organosiloxanes*, Journal of Polymer Science, vol. XL (1959) 35-58.

\* cited by examiner

FINISH COMPOSITION

CROSS REFERENCE TO RELATED APPLICATIONS

This application claims the benefit of U.S. Provisional Patent Application No. 62/686,779, filed on Jun. 19, 2018 and Provisional Patent Application No. 62/743,782, filed on Oct. 10, 2018, the disclosure of which is hereby incorporated by reference in its entirety

FIELD

The present invention relates generally to finish compositions, and more particularly, to finish compositions for the treatment of polyacrylonitrile carbon fiber precursors.

BACKGROUND

Carbon fibers have been used in a wide variety of structural applications and industries because of their desirable properties. For example, carbon fibers can be formed into a structural component that combines high strength and high stiffness, while having a weight that is significantly lighter than a metal component of equivalent properties. One common method of preparing carbon fibers involves converting a polyacrylonitrile (PAN) precursor fiber, in a multi-step process in which the precursor fiber is heated, oxidized, and carbonized to produce a fiber that is 90% or greater carbon. The resulting carbon fibers can be molded into high strength composite materials for structural applications, used in their pure form for electrical and friction applications, or can be further processed for use in adsorbent, filter, or other applications. In particular, composite materials have been developed in which carbon fibers serve as a reinforcing material in a resin, ceramic, or metal matrix.

The PAN precursor fibers are typically prepared by melt spinning or by solvating the precursor polymers in organic and/or inorganic solvents such as dimethylsulfoxide, dimethyl formamide, zinc chloride or sodium thiocyanate solutions to form a spinning solution. For example, the spinning solution may be formed from water, acrylonitrile polymer and sodium thiocyanate at exemplary respective weight ratios of about 60:10:30. This solution can then be concentrated through evaporation and filtered to provide the spinning solution. The spinning solution is passed through spinnerets using various spinning processes, such as dry, dry/wet or wet spinning, to form the polyacrylonitrile precursor fiber. After exiting from the spinneret, the spun filaments are washed. In some embodiments, the spun filaments can be stretched up to several times their original length in hot water and steam.

After the fibers have been washed, they are typically subjected to a chemical treatment that is applied to the fibers. The chemical, process oil or "finish" comprises an aqueous solution or emulsion that may include lubricants and antistatic additives that help to improve the fibers handling during subsequent manufacture of the carbon fiber. Examples of lubricants includes siloxanes, esters, among others. Silicones are one of the more common finish compositions used to treat PAN precursor fibers. Examples of typical silicones include polysiloxanes, such as polydimethylsiloxane, silicone oil, and ethoxysiloxane. Amino-modified or epoxy-modified silicone emulsions are a finish composition that may be used to improve the heat resistance of the fibers. In particular, functionalized polysiloxanes having amino or epoxy groups are known to decrease heat released during oxidation/stabilization of the PAN precursor fibers. As a consequence, this helps to prevent or reduce fiber fusion during the carbonization process.

It is also important that a sufficient and uniform amount of the finish composition is applied to the surface of the fibers in order to provide the desired properties. If the finish composition is not uniformly applied, defects may arise in the resulting carbon fibers.

Accordingly, there still exists a need for improved finish compositions for the treatment of PAN precursor fibers.

SUMMARY

Embodiments of the invention are directed to improved finish composition for the treatment of textiles, and in particular, the treatment of polyacrylonitrile (PAN) precursor fibers. In one embodiment, the invention provides a finish composition comprising a silicone oil, water, emulsifier, and a dicarboxylic acid having a molecular weight of less than 1,000 g/mol and a pKa from about 1 to 4.

The use of silicone oils, including epoxy-modified silicones and amino-modified silicones are commonly used in finish compositions for the treatment of PAN precursor fibers. The application of such siloxanes to the PAN precursor fiber is usually done with water emulsions. One of the most effective ways to prepare an aqueous emulsion, such as an amino-modified siloxane, is to include a weak acidic species (e.g., pKa ranging from 4 to 5) into the composition, either as a part of the surfactant or emulsifier structure, or as a separate entity.

In the case of amino-modified siloxanes, addition of the weakly acid species results in the formation of a salt/complex with the amino groups of the siloxane. The formation of the salt complex greatly improves the water solubility of the siloxane, and also helps to prevent the amine groups from reacting at elevated temperatures, which are known to cause gelation/gum formation and accumulation of silicone materials on drying rolls in PAN-fiber production lines.

While the weakly acidic groups do help prevent undesirable reaction of the amino groups at elevated temperatures, it has been found that the weakly acidic groups do not adequately bind with the amino groups of the siloxane. As a result, the fibers are not adequately protected at elevated temperatures, such as those experienced during drying of the fibers. To address this issue, it may be desirable to include antioxidants in the finish composition. However, the inclusion of antioxidants does not address all difficulties with respect to protection of the amine groups on the siloxane materials.

In addition, phase separation of the emulsion in the finish composition may also occur at elevated temperatures as a result of the breakdown of the acid-amine complex/salt, and by thermal decomposition/evaporation of the weakly acidic species. In particular, the acid-base salt/complex group that helped formation of a high-quality emulsion disappears and the silicone material starts to separate from the rest of the emulsion. In addition, when utilizing lower molecular weight carboxylic acids as the weakly acidic species, these species may be lost due to evaporation at higher temperatures.

The phase separation of silicone oil from the emulsion is highly undesirable because it leads to the uneven distribution of the aforementioned oil on individual filaments, which may result in a presence of areas with high and low silicone oil content. The areas of the filament that do not have adequate amount of protecting coating of the finish composition, and as a consequence, are prone to undergo fusion with other filaments during carbon fiber manufacture. Such filament fusion may lead to formation of stress points that are susceptible to breakage during tow stretching processes in carbon fiber lines. Excessive individual filament breakage in the carbon fiber tow is known as "fuzz" and is highly undesirable.

Advantageously, the inventor has discovered that the inclusion of dicarboxylic acids having a pKa from about 1 to 4, a molecular weight of less than 1,000 g/mol overcomes problems associated with phase separation, and undesirable reaction of functional groups, such as amino functional groups, on the PAN precursor fibers.

In one embodiment, embodiments of the invention provide a finish composition comprising: a polysiloxane; an emulsifier; water; and a dicarboxylic acid having a $pK_a$ from about 1 to 4, and boiling point from 200 to 400° C.

In some embodiments, the finish composition may further comprise a monocarboxylic acid having a $pK_a$ greater than 3.7, such as 3.77 to 5.0. In some embodiments, the monocarboxlic acid is selected from the group consisting of formic acid, acetic acid, propionic acid, butyric acid, isobutyric acid, valeric acid, isovaleric acid, caproic acid, a hydroxycarboxylic acid of 4 carbon atoms or less, such as glycolic acid and lactic acid.

In some embodiments, the composition further comprises a viscosity modifier, such as an aminocarboxylic material. In one embodiment, the viscosity modifier comprises β-alanine.

In one embodiment, t the dicarboxylic acid has the following formula:

wherein $R_1$ is absent or a saturated or unsaturated, linear or branched, aromatic, substituted or unsubstituted, hydrocarbon group;

$Y_1$ and $Y_2$ are independently nitrogen, oxygen, sulfur or phosphorus, hydrogen, $C_1$-$C_6$ alkyl group, or an alkoxy group;

$X_1$ and $X_2$ are independently one or more hydrogen atoms, a metal, a quaternary amine, or a hydrocarbon group having up to 6 carbon atoms, the hydrocarbon group being an alkyl group, an alkylene group, or an aromatic group, which may be branched or linear, and may optionally have one or more heteroatoms selected from the group consisting of nitrogen, oxygen, sulfur and phosphorus.

In certain embodiments, $R_1$ is a saturated, linear alkyl chain having 2 to 3 carbon atoms.

In certain embodiments, $R_1$ is a saturated, branched alkyl chain having 2 to 4 carbon atoms.

In certain embodiments, $R_1$ is a saturated linear or branched alkyl chain substituted with one or more of nitrogen, oxygen, sulfur or phosphorus containing groups, and the number of carbon atoms in the linear alkyl chain is up to 6.

In certain embodiments, $R_1$ is an unsaturated, linear alkyl chain having up to 6 carbon atoms.

In certain embodiments, $R_1$ is an unsaturated, branched alkyl chain having up to 6 carbon atoms.

In certain embodiments, $R_1$ is an unsaturated, linear alkyl chain having up to 6 carbon atoms, and being substituted with one or more of a nitrogen containing group, an oxygen containing group, a sulfur containing group, or a phosphorous containing group.

In certain embodiments, $R_1$ is an unsaturated, branched alkyl chain having up to 6 carbon atoms, and being substituted with one or more of a nitrogen containing group, an oxygen containing group, a sulfur containing group, or a phosphorous containing group.

In certain embodiments, $R_1$ includes one or more polyethylene or polypropylene glycol groups.

In certain embodiments, $R_1$ is an aromatic group that is optionally substituted with one or more of an alkyl group having 1 to 6 carbon atoms, a nitrogen containing group, an oxygen containing group, a sulfur containing group, or a phosphorous containing group.

In certain embodiments, $R_1$ includes one or more of an alkene, alkyne, alcohol, carbonyl, ether, amine, amide, phenyl, benzene, furan, pyridine, or pyran group, or imidazole group.

In certain embodiments, $X_1$ and $X_2$ are independently, hydrogen, an alcohol, or a phenol.

In some embodiments, $X_1Y_1$ and $X_2Y_2$ are both OH groups. In certain embodiments, $X_1Y_1$ comprises an amine or amide group, and at least one of $X_2Y_2$ comprises an OH group.

In some embodiments, the finish composition includes a monocarboxylic acid having a $pK_{a1}$ greater than 3.7, and in particular greater than 4.

In some embodiments, the dicarboxylic acid has a $pK_a$ from about 2 to 3.5, such as a $pK_a$ from about 2 to 3.

In some embodiments, the dicarboxylic acid has a molecular weight less than about 1,000 g/mol, such as from about 100 to 600 g/mol or from about 125 to 250 g/mol.

In some embodiments, the dicarboxylic acid has a boiling/decomposition point that from 200 to 450° C., such as from about 200 to 350° C.

In some embodiments, the dicarboxylic acid is selected from the group consisting of DL-Tartaric acid, L-Tartaric acid, D-Tartaric acid, fumaric acid, mesaconic acid, oxamic acid, succinic acid, 2-methyl succinic acid, L-malic acid, DL-malic acid, D-malic acid, aspartic acid, mesoxalic acid, muconic acid, oxaloacetic acid, glutamic acid, diglycolic acid, Iminodiactetic acid, 2,2'-oxydipropanoic acid, 3,3'-oxydipropanoic acid, 2,2'-[1,2-ethanediylbis(oxy)]bis-acetic acid, 3,3'-[1,2-ethanediylbis(oxy)]bis-propanoic acid, 3,3'-[oxybis(ethane-2,1-diyloxy)]dipropanoic acid, poly(ethylene glycol)bis-acetic acid, polyethylene glycol bis(carboxymethyl) ether, polyehtylene glycol diacid 600, chelidonic acid, dipicolinic acid, 2,5-furandicarboxylic acid, isophthalic acid, terephtalic acid, orthophthalic acid, trimesic acid, 1,4-phenylene diacetic acid, 1,3-phenylene diacetic acid, ammonium tartrate dibasic, potassium tartrate monobasic, ammonium hydrogenoxalate, monomethyl fumarate, and monoethyl fumarate, and derivatives, and mixtures thereof.

In one embodiment, the polysiloxane is an amino-modified polysiloxane.

In certain embodiments, the amount of polysiloxane in the composition is from about 50 to 95 weight percent based on the total weight of the composition, such as from about 60 to 80 weight percent based on the total weight of the composition.

In certain embodiments, the emulsifier is nonionic. In some embodiments, the emulsifier is a water-soluble POE alkyl ether, POE alkylaryl ether or POE fatty acid ester, or a mixture thereof.

In some embodiments, the amount of the emulsifier in the composition is from about 5 to 40 weight percent, and in particular, from about 25 to 35 weight percent, based on the total weight of the composition.

Aspects of the invention are also directed to a fiber comprising polyacrylonitrile and having the inventive finish coating applied to a surface thereof.

Aspects of the invention are also directed to the use of the finish composition for the manufacture of carbon fibers.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout. As used in the specification, and in the appended claims, the singular forms "a", "an", "the", include plural referents unless the context clearly dictates otherwise.

I. Definitions

For the purposes of the present application, the following terms shall have the following meanings:

The term "fiber" can refer to a fiber of finite length or a filament of infinite length.

The term "precursor fiber" refers to a fiber comprising a polymeric material that can, upon the application of sufficient heat, be converted into a carbon fiber having a carbon content that is about 85% or greater, and in particular about 95% or greater, by weight. The precursor fiber can comprise both homopolymers and copolymers of acrylonitrile (AN), and may include copolymers such as methyl acrylate (MA), methacrylic acid (MAA), sodium methallylsulfonate, itaconic acid (IA), vinyl bromide (VB), isobutyl methacrylate (IBMA), and combinations thereof. In one embodiment, the precursor fiber comprises a polyacrylonitrile (PAN) polymer formed primarily from acrylonitrile monomers.

The terms "about" and "substantially" as used herein means a deviation (plus/minus) of less than 10%, and in particular, less than 5%, less than 4%, less than 3%, and less than 2% of the recited value.

Embodiments of the invention are directed to emulsions that are particularly suitable for use as finish compositions in the treatment of PAN precursor fibers. In certain embodiments, the emulsions comprise a silicone oil, an emulsifier; water; and a dicarboxylic acid having a pKa from about 1 to 4, and a molecular weight less than about 1,000 g/mol.

1. Polysiloxanes

Generally, a wide variety of different silicone oils may be used in embodiments of the present invention. Examples of such silicone oils generally include polysiloxanes, such as polydimethylsiloxanes, methylphenyl polysiloxanes, poly (dimethyl siloxane-co-methylphenylsiloxane), and the like. In addition, the polysiloxanes may be modified with epoxy or amino functional groups, among others.

In one embodiment, the silicone oil comprises an amino-modified polysiloxane. For example, the silicone oil may comprise an amino-modified siloxane having a nitrogen content in amino groups of 0.05-3.2 wt. %, and in particular, 0.05 to 2.0 wt. %. Further discussion of polysiloxanes that may be used in embodiments of the invention are discussed in U.S. Pat. No. 5,726,241, the contents of which are hereby incorporated by reference.

The structure of an amino-modified siloxane is not particularly limited to any particular structure. For instance, in some embodiments the amino groups, i.e., modifying group, in the amino-modified siloxane can be bonded to the side chain of the main chain, i.e., silicone, to the terminal of the main chain, or to both. The amino group can either be a monoamine or polyamine, and both of them can exist in one molecular of the amino-modified siloxane.

In one embodiment, the silicone oil comprises an amino-modified polysiloxane having the following formula;

wherein $R_2$ is a hydrogen atom, a lower alkyl group or an aryl group; $R_3$ and R4 are each a lower alkyl group or an aryl group; $R_5$ is a hydrogen atom or a group of wherein $R_8$ and $R_9$ are each a lower alkyl group and $R_{10}$ is a hydrogen atom or a lower alkyl group); $R_6$ and $R_7$ are each a hydrogen atom or a lower alkyl group; and A is an alkylene group containing 2 to 5 carbon atoms or phenylene group, and x and y are positive integers which provide a molecular weight of the aminosiloxane of not more than 100,000.

In one embodiment, the aminosiloxane is a random copolymer consisting essentially of substituted siloxyl and aminosiloxyl recurring units, as shown by the above-mentioned general formula, and a liquid polymer having a molecular weight of not more than 100,000 is generally used. The lower limit of such an aminosiloxane should be generally about 2000, and it is preferable that the ratio (x:y) of the substituted siloxyl units (x) to the aminosiloxyl units (y) should be 4-200:1. The lower alkyl groups selected as $R_2$, $R_3$, $R_5$, $R_6$, $R_7$, $R_8$, $R_9$ and $R_{10}$ are generally those having 1-6 carbon atoms, and those having not more than 4 carbon atoms are used preferably. A further discussion of such amino-modified polysiloxanes are described in U.S. Pat. No. 4,009,248, the contents of which are hereby incorporated by reference.

In a further embodiment, the polysiloxane comprises an amino-modified polysiloxane having the following formula:

where x is a number from 100 to 5,000, and in particular from 200 to 1,000; and y is a number from 1 to 100, and in particular from 5 to 50. In a preferred embodiment, the ratio of x:y is from about 10 to 1,000, and in particular, from about 10 to 400.

In certain embodiments, the polysiloxane comprises an amino-modified polysiloxane having the following formula:

where $R_{12}$ is a C1-20 alkyl or aryl group, preferably a C1-10 alkyl or aryl group, more preferably a C1-5 alkyl group, and further more preferably a methyl group. The plurality of $R_{12}$s in the formula can either be the same or different. $R_{13}$ is a group represented by the following chemical formula:

$R_{11}$ is a group represented by $R_{12}$, $R_{13}$ or $-OR_{10}$, and preferably $R_{12}$. The plurality of $R_{11}$s can either be the same or different. $R_{10}$ is a hydrogen atom or $C_{1-6}$ alkyl group, preferably a hydrogen atom or $C_1$-$C_4$ alkyl group, and more preferably a hydrogen atom or methyl group; p is a number ranging from 10 to 10000, preferably from 50 to 5000, and more preferably from 100 to 2000; and q is a number ranging from 0.1 to 1000, preferably from 0.5 to 500, and more preferably from 1 to 100.

In the above formula, each of $R_{14}$ and $R_{16}$ is independently a $C_1$-$C_6$ alkylene group, and preferably a $C_1$-$C_3$ alkylene group. Each of $R_{15}$, $R_{17}$ and $R_{18}$ is independently a hydrogen atom or $C_1$-$C_{10}$ alkyl or aryl group, preferably a hydrogen atom or $C_1$-$C_5$ alkyl group, and more preferably a hydrogen atom; and r is a number ranging from 0 to 6, preferably from 0 to 3, and more preferably from 0 to 1.

Other polysiloxanes that may be used in certain embodiments of the invention include the following:

where x is a number from 100 to 5,000, and in particular from 200 to 1,000; and y is a number from 1 to 100, and in particular from 10 to 50;

where x is a number from 100 to 5,000, and in particular from 200 to 1,000; and y is a number from 10 to 500, and in particular from 10 to 100;

where x is a number from 10 to 5,000, and in particular from 50 to 1,000; and y is a number from 1 to 100, and in particular from 10 to 50, and n is a number from 1 to 100, and in particular, from 5 to 50.

The viscosity of the polysiloxanes at 25° C. is not specifically restricted, though excessively low viscosity of the polysiloxane can make the resultant finish composition prone to be dropped off from fiber or deteriorate the stability of the aqueous emulsion of the resultant finish composition to cause nonuniform finish application on fiber and failure in preventing the fiber from fusing. On the other hand, excessively high viscosity of the polysiloxane can result in increased stickiness and gumming up of the silicone. In some embodiments, it may be desirable for the viscosity of the polysiloxane at 25° C. to range from 100 to 100,000 cps, and in particular from 100 to 15,000 cps, more particularly from 500 to 10,000 cps, and further more particularly from 1,000 to 5,000 cps.

In some embodiments, the silicone oil may include a mixture of different polysiloxanes. For example, in certain embodiments the silicone oil may comprise an amine-modified polysiloxane in combination with one or more of a polydimethylsiloxane or polymethylphenylsiloxane, or a polyether-modified or epoxy-modified or other-modified polysiloxane.

The amount of silicone oil in the finish composition is typically from about 50 to 95 weight percent based on the total weight of the finish composition, and in particular, from about 65 to 90, and more particularly from about 60 to 80 weight percent, based on the total weight of the finish composition.

Desirably, the polysiloxane, such as an amino-modified polysiloxane, should be introduced into the PAN precursor fiber in an amount of at least 0.01%, and preferably at least 0.05% based on the weight of the PAN precursor fiber. With an amount of introduction of less than 0.01%, it is difficult to sufficiently display the effect of the present invention. On the other hand, introduction of too much an amount of the polysiloxane is not economical since no better effect is expected. Therefore, it is desired that the upper limit of the amount of introduction of the aminosiloxane should be in the order of about 5% based on the weight of the PAN precursor fiber.

2. Dicarboxylic Acids

As noted previously, it has been discovered that the inclusion of a dicarboxylic acid having a pKa from about 1 to 4, a molecular weight of less than 1,000 g/mol, and a boiling/decomposition point of from 200 to 400° C. in the finish composition provides an emulsion having improved stability, heat resistance, and which results in carbon fibers having less fuzz and reductions in broken filaments.

In one embodiment, the dicarboxylic acid has the following formula:

wherein $R_1$ is absent or a saturated or unsaturated, linear or branched, aromatic, substituted or unsubstituted, hydrocarbon group;

$Y_1$ and $Y_2$ are independently a nitrogen, oxygen, sulfur or phosphorus containing group, hydrogen, $C_1$-$C_6$ alkyl groups, alkoxy groups, and/or phenyl groups.

$X_1$ and $X_2$ are independently a hydrogen, a metal, a quaternary amine, an alcohol, or a hydrocarbon group having up to 6 carbon atoms, the hydrocarbon group being an alkyl group, an alkylene group, or an aromatic group, which may be branched or linear, and may optionally have one or more heteroatoms selected from the group consisting of nitrogen, oxygen, sulfur and phosphorus.

Examples of metals for $X_1$ and $X_2$ include alkali metals, such as lithium, potassium, and sodium.

Generally, $R_1$ is not limited to any particular chain length or moiety provided that the $pK_{a1}$ of the dicarboxylic acid is about 4 or less. For example, if the $R_1$ is a saturated, linear alkyl chain then the number of carbon atoms will generally be 4 or less. However, if $R_1$ includes additional moieties, such as nitrogen, oxygen, sulfur or phosphorous containing groups, aromatic groups, alkenes or alkynes, the number of carbon atoms (if any) in $R_1$ can be higher provided the $pK_{a1}$ of the resulting acid is about 4 or less.

By way of guidance, some examples of possible embodiments of $R_1$ are provided below in which $R_1$ is selected from a hydrocarbon having any one or more of the following:

a saturated, branched alkyl chain having up to 4 carbon atoms;

a saturated, linear alkyl chain having 2 to 3 carbon atoms;

a saturated, linear or branched alkyl chain substituted with one or more of nitrogen, oxygen, sulfur or phosphorus containing groups (examples of such groups include carbonyls, ethers, amides, amines, alcohols, and the like);

an unsaturated, branched or linear alkyl group having up to 6 carbon atoms;

an unsaturated, branched or linear alkyl group substituted with one or more of nitrogen, oxygen, sulfur or phosphorus containing groups, and wherein the number of carbon atoms in the linear alkyl chain is up to 6 (examples of such groups include carbonyls, ethers, amides, amines, alcohols, and the like);

one or more polyethylene glycol or polypropylene glycol groups;

an aromatic group that is optionally substituted with one or more of an alkyl group having 1 to 6 carbon atoms, a nitrogen containing group, an oxygen containing group, a sulfur containing group, or a phosphorous containing group (examples of such groups include carbonyls, ethers, amides, amines, alcohols, and the like); and one or more of an alkene, alkyne, alcohol, carbonyl, ether, amine, amide, phenyl, benzene, furan, pyridine, or pyran group, or imidazole group.

In some embodiments, $R_1$ may also include combinations of the foregoing exemplary hydrocarbon groups. It should also be recognized that in some embodiments $R_1$ may be absent.

Typically, the $pK_{a1}$ of the dicarboxylic acid is from about 1 to 4, and in particular, from about 2 to 3.5.

In addition to the restriction on the $pK_{a1}$ of the dicarboxylic acid, it is also desirable that the dicarboxylic have a molecular weight from about 50 to 1,000 g/mol, and in particular, from about 75 to 500, and more particularly, from about 100 to 250 g/mol.

In one embodiment, the dicarboxylic acid has a molecular weight that is less than 1,000 g/mol, less than 950 g/mol, less than 900 g/mol, less than 850 g/mol, less than 800 g/mol, less than 750 g/mol, less than 700 g/mol, less than 650 g/mol, less than 600 g/mol, less than 550 g/mol, less than 500 g/mol, less than 450 g/mol, less than 400 g/mol, less than 350 g/mol, 300 g/mol, less than 250 g/mol, less than 200 g/mol, less than 150 g/mol, and less than 100 g/mol.

In one embodiment, the dicarboxylic acid has a molecular weight that is greater than 50 g/mol, greater than 100 g/mol, greater than 150 g/mol, greater than 200 g/mol, greater than 250 g/mol, greater than 300 g/mol, greater than 350 g/mol, greater than 400 g/mol, greater than 450 g/mol, greater than 500 g/mol, less than 550 g/mol greater than 600 g/mol, less than 650 g/mol, greater than 700 g/mol, 750 g/mol, greater than 800 g/mol, greater than 850 g/mol, greater than 900 g/mol, and greater than 950 g/mol.

In certain embodiments, the dicarboxylic acid has a boiling point that is from about 200 to 400° C. For instance, the boiling point/decomposition temperature of the dicarboxylic acid may be from about 225 to 375° C., and in particular, from about 250 to 350° C., and more particularly, from about 275 to 350° C. Preferably, the boiling point/decomposition temperature of the dicarboxylic acid is less than 350° C., but not less than 200° C.

The amount of dicarboxylic acid present in the finish composition may range from about 0.1 to 10 weight percent, based on the total weight of the composition, and in particular, from about 0.5 to 10, and more particularly, from about 1 to 10 weight percent, based on the total weight of the composition. In some embodiments, the amount of dicarboxylic acid present in the finish composition is from about 1 to 8 weight percent, and in particular, from about 2 to 6 weight percent, and more particularly, from about 3 to 5 weight percent.

Examples of dicarboxylic acid that may be used in certain embodiments of the invention include DL-Tartaric acid, L-Tartaric acid, D-Tartaric acid, fumaric acid, mesaconic acid, oxamic acid, succinic acid, 2-methyl succinic acid, L-malic acid, DL-malic acid, D-malic acid, aspartic acid, mesoxalic acid, muconic acid, oxaloacetic acid, glutamic acid, diglycolic acid, Iminodiactetic acid, 2,2'-oxydipropanoic acid, 3,3'-oxydipropanoic acid, 2,2'-[1,2-ethanediyl-bis(oxy)]bis-acetic acid, 3,3'-[1,2-ethanediylbis(oxy)]bis-propanoic acid, 3,3'-[oxybis(ethane-2,1-diyloxy)] dipropanoic acid, poly(ethylene glycol)bis-acetic acid, polyethylene glycol bis(carboxymethyl) ether, polyehtylene glycol diacid 600, chelidonic acid, dipicolinic acid, 2,5-furandicarboxylic acid, isophthalic acid, terephtalic acid, orthophthalic acid, trimesic acid, 1,4-phenylene diacetic acid, 1,3-phenylene diacetic acid and their derivatives, such as, ammonium tartrate dibasic, potassium tartrate monobasic, ammonium hydrogenoxalate, monomethyl fumarate, and monoethyl fumarate, and mixtures thereof.

In some embodiments, the dicarboxylic acid may comprise a ketoacid, such as one or more of the following hydroxypyruvic acid, alpha-ketoglutaric and beta-ketoglutaric, alpha-ketoadipic acid, α-ketovaleric acid, levulinic acid, 4-hydroxy-2-oxopentanoic acid, and 4-hydroxyphenylpyruvic acid.

In one embodiment, the dicarboxylic acid comprises oxamic acid or an oxamic derivative in accordance with one of the following exemplary formula:

In oxamic acid, $R_1$ is absent and $X_1Y_1$ is an amine, and $X_2Y_2$ is an OH group. Oxamic acid has a $pK_{a1}$ of 2.49 and a molecular weight of 89.05 g/mol.

In one embodiment, the dicarboxylic acid comprises a keto acid, such as α-ketovaleric acid or a derivative thereof in accordance with one of the following exemplary formulas:

In ketovaleric acid acid, $R_1$ is absent and one of $X_1Y_1$ and $X_2Y_2$ is a propyl group, and the other is an OH group. In the second structure above, the keto acid is α-ketoisovaleric acid having a $pK_{a1}$ of 3.37.

In one embodiment, the dicarboxylic acid comprises 4-hydroxy-2-oxopentanoic acid, or a derivative thereof in accordance with one of the following exemplary formula:

In 4-Hydroxy-2-oxopentanoic acid, $R_1$ is absent and one of $X_1Y_1$ and $X_2Y_2$ is a propyl alcohol, and the other is an OH group. 4-Hydroxy-2-oxopentanoic acid has a molecular weight of 132.11 g/mol.

In one embodiment, the dicarboxylic acid comprises 4-hydroxyphenylpyruvic acid, or a derivative thereof in accordance with one of the following exemplary formula:

In 4-hydroxyphenylpyruvic acid, $R_1$ is absent and one of $X_1Y_1$ and $X_2Y_2$ is a methyl phenol, and the other is an OH group. 4-hydroxyphenylpyruvic acid has a melting point of 219° C., has a $pK_{a1}$ of 2.98.

In one embodiment, the dicarboxylic acid comprises hydroxypyruvic acid or a derivative thereof in accordance with one of the following exemplary formula:

In hydroxypyruvic acid, $R_1$ is absent and $X_1Y_1$ is an OH group, and $X_2Y_2$ is a methyl alcohol. Hydroxypyruvic acid has a boiling point of 257° C., a $pK_{a1}$ of 2.57 and a molecular weight of 104.06 g/mol.

In one embodiment, the dicarboxylic acid comprises an oxaloacetic acid or an oxaloacetic derivative in accordance with one of the following exemplary formula:

In this embodiment, $R_1$ includes a carbonyl group, and $X_1Y_1$ and $X_2Y_2$ are both OH groups. Oxaloacetic acid has a $pK_{a1}$ of 2.22 and a boiling point of 217° C.

In one embodiment, the dicarboxylic acid comprises tartaric acid or a tartaric acid derivative in accordance with the following exemplary formula:

In this embodiment, $R_1$ includes two alcohols (OH groups), and $X_1Y_1$ and $X_2Y_2$ are both OH groups. DL-tararic acid has a boiling point of 273° C., and a $pK_{a1}$ of 3.22.

In one embodiment, the dicarboxylic acid comprises fumaric acid or a fumaric acid derivative in accordance with the following exemplary formula:

In fumaric acid $R_1$ is an ethylene group, and $X_1Y_1$ and $X_2Y_2$ are both OH groups. Fumaric acid has a decomposition temperature of 287° C., and a $pK_{a1}$ of 3.03.

In one embodiment, the dicarboxylic acid comprises mesaconic acid or a mesaconic acid derivative in accordance with the following exemplary formula:

Mesaconic acid has a decomposition temperature of 250° C., and a $pK_{a1}$ of 3.72.

In one embodiment, the dicarboxylic acid comprises succinic acid or a succinic acid derivative in accordance with one of the following exemplary formulas:

Succunic acid has a acid has a boiling point of 235° C., and a $pK_{a1}$ of 4.2.

In one embodiment, the dicarboxylic acid comprises malic acid or a malic acid derivative in accordance with the following exemplary formula:

In malic acid, $R_1$ include an OH group. Malic acid has a decomposition temperature of 225° C., and a $pK_{a1}$ of 3.4.

In one embodiment, the dicarboxylic acid comprises aspartic acid or an aspartic acid derivative in accordance with the following exemplary formula:

In this embodiment, $R_1$ includes an amine group, and $X_1Y_1$ and $X_2Y_2$ are both OH groups. Aspartic acid has a decomposition temperature of 324° C., and a $pK_{a1}$ of 3.9.

In one embodiment, the dicarboxylic acid comprises mesoxalic acid or a mesoxalic acid derivative in accordance with the following exemplary formula:

In this embodiment, $R_1$ includes a carbonyl group, and $X_1Y_1$ and $X_2Y_2$ are both OH groups. Mesoxalic acid has a $pK_{a1}$ of 1.23.

In one embodiment, the dicarboxylic acid comprises muconic acid or a muconic acid derivative in accordance with the following exemplary formula:

Muconic acid has a decomposition temperature of 345° C., and a $pK_{a1}$ of 3.87.

In one embodiment, the dicarboxylic acid comprises glutamic acid or a glutamic acid derivative in accordance with the following exemplary formula:

Glutamic acid has $pK_{a1}$ of 2.19.

In one embodiment, the dicarboxylic acid comprises diglycolic acid or a diglycolic acid derivative in accordance with the following exemplary formula:

In this embodiment, $R_1$ includes an ether, and $X_1Y_1$ and $X_2Y_2$ are both OH groups.

In one embodiment, the dicarboxylic acid comprises iminodiacetic acid or a iminodiacetic acid derivative in accordance with the following exemplary formula:

In iminodiacetic acid, $R_1$ includes an amide and $X_1Y_1$ and $X_2Y_2$ are both OH groups. Iminodiacetic acid has a $pK_a$ of 1.873, a boiling point of 371° C., and a molecular weight of 133.1 g/mol.

In one embodiment, the dicarboxylic acid comprises oxydipropanoic acid or an oxydipropanoic acid derivative (e.g., 2,2'-oxydipropanoic acid and 3,3'-oxydipropanoic acid) in accordance with the following exemplary formula:

In the oxydipropanoic acids, $R_1$ includes an ether group, and $X_1Y_1$ and $X_2Y_2$ are both OH groups. 2,2'-oxydipropanoic acid has a boiling point of 392° C., and a molecular weight of 162.14 g/mol. 3,3'-oxydipropanoic acid has a boiling point of 371.4° C. and a molecular weight of 162.14 g/mol.

In one embodiment, the dicarboxylic acid comprises 2,2'-[1,2-ethanediylbis(oxy)]bis acetic acid or a derivative thereof in accordance with the following exemplary formula:

2,2'-[1,2-ethanediylbis(oxy)]bis acetic acid has a molecular weight of 178.14 g/mol.

In one embodiment, the dicarboxylic acid comprises 3,3'-[1,2-ethanediylbis(oxy)]bis-propanoic acid or a derivative thereof in accordance with the following exemplary formula:

3,3'-[1,2-ethanediylbis(oxy)]bis-propanoic acid has a molecular weight of 206.19 g/mol.

In one embodiment, the dicarboxylic acid comprises potassium tartrate monobasic or a derivative thereof in accordance with the following exemplary formula:

In one embodiment, the dicarboxylic acid comprises ammonium tartrate dibasic or a derivative thereof in accordance with the following exemplary formula:

In one embodiment, the dicarboxylic acid comprises a chelidonic acid or derivatives thereof in accordance with the following exemplary formula:

Chelidonic acid has a decomposition temperature of 257° C., and a $pK_{a1}$ of 1.7.

In one embodiment, the dicarboxylic acid comprises a dipicolinic acid or derivatives thereof in accordance with the following exemplary formula:

Dipicolinic acid has a decomposition temperature of 248° C., and a $pK_{a1}$ of 3.24.

In one embodiment, the dicarboxylic acid comprises a furane derivative such as 2,5-furanedicarboxylic acid or derivatives thereof in accordance with the following exemplary formula:

2,5-furanedicarboxylic acid has a $pK_{a1}$ of 2.28.

In one embodiment, the dicarboxylic acid comprises 1,3-phenylenediacetic acid or 1,4-phenylenediacetic acid or derivatives thereof in accordance with the following exemplary formulas:

In one embodiment, the dicarboxylic acid comprises phthalic acid, or phthalic acid derivative, such as orthophthalic acid, isophthalic acid, terephthalic acid, and trimesic acid, or derivatives thereof in accordance with the following exemplary formulas:

In one embodiment, the dicarboxylic acid comprises a fumaric acid derivative, such as monomethyl fumurate or monoethyl fumurate thereof in accordance with the following exemplary formulas:

3. Emulsifiers

The finish composition may also include an emulsifier. Generally, the emulsifier is a surfactant that is used to emulsify or disperse the polysiloxanes mentioned above in water. The emulsifier is not specifically restricted, and can be selected from nonionic, anionic, cationic and amphoteric surfactants known to those skilled in the art. One of or a combination of at least two of such emulsifiers can be used.

The nonionic emulsifiers include, for example, linear polyoxyalkylene alkylethers, such as polyoxyethylene hexyl ether, polyoxyethylene octyl ether, polyoxyethylene decyl ether, polyoxyethylene lauryl ether and polyoxyethylene cetyl ether; branched polyoxyalkylene primary alkyl ethers, such as polyoxyethylene 2-ethylhexyl ether, polyoxyethylene isocetyl ether and polyoxyethylene isostearyl ether; branched polyoxyalkylene secondary alkyl ethers, such as polyoxyethylene 1-hexylhexyl ether, polyoxyethylene 1-octylhexyl ether, polyoxyethylene 1-hexyloctyl ether, polyoxyethylene 1-pentylheptyl ether and polyoxyethylene 1-heptylpentyl ether; polyoxyalkylene alkenyl ethers, such as polyoxyethylene oleyl ether; polyoxyalkylene alkylphenyl ethers, such as polyoxyethylene octylphenyl ether, polyoxyethylene nonylphenyl ether, and polyoxyethylene dodecylphenyl ether; polyoxyalkylene alkylarylphenyl ethers, such as polyoxyethylene tribenzyl phenyl, polyoxyethylene dibenzylphenyl ether, and polyoxyethylene benzylphenyl ether; polyoxyalkylene fatty acid esters, such as polyoxyethylene monolaurate, polyoxyethylene monooleate, polyoxyethylene monostearate, polyoxyethylene monomyristylate, polyoxyethylene dilaurate, polyoxyethylene dioleate, polyoxyethylene dimyristylate, and polyoxyethylene distearate; sorbitan esters, such as sorbitan monopalmitate and sorbitan monooleate; polyoxyalkylene sorbitan fatty acid esters, such as polyoxyethylene sorbitan monostearate and polyoxyethylene sorbitan monooleate; glycerin fatty acid esters, such as glycerin monostearate, glycerin monolaurate and glycerin monopalmitate; polyoxyalkylene sorbitol fatty acid esters; sucrose fatty acid esters; polyoxyalkylene castor oil ethers, such as polyoxyethylene castor oil ether; polyoxyalkylene hydrogenated castor oil ethers, such as polyoxyethylene hydrogenated castor oil ether; polyoxyalkylene alkyl aminoethers, such as polyoxyethylene lauryl aminoether and polyoxyethylene stearyl aminoether; oxyethylene-oxypropylene block or random copolymers; terminally alkyletherified oxyethylene-oxypropylene block or random copolymers; and terminally sucrose-etherified oxyethylene-oxypropylene block or random copolymers.

Of those nonionic emulsifiers, branched polyoxyalkylene primary alkylethers, branched polyoxyalkylene secondary alkylethers, polyoxyalkylene alkenyl ethers, polyoxyalkylene alkylphenyl ethers, polyoxyalkylene fatty acid esters, oxyethylene-oxypropylene block copolymers and terminally alkyletherified oxyethylene-oxypropylene block copolymers are preferable for their excellent performance to emulsify silicone compounds in water. Furthermore, oxyethylene-oxypropylene block or random copolymers and terminally alkyletherified oxyethylene-oxypropylene block copolymers are more preferable for their performance to change into a tarry substance on fiber in baking process so as to protect fiber from damage.

The anionic emulsifiers include salts of various acids, such as salts of fatty acids, salts of hydroxyl-group-containing carboxylic acids, such as hydroxyacetic acid, potassium hydroxyacetate, lactic acid and potassium lactate; salts of polyoxyalkylene alkylether acetic acids, such as the sodium salt of polyoxyalkylene tridecyl ether acetic acid; salts of carboxyl-polysubstituted aromatic compounds, such as potassium trimellitate and potassium pyromellitate; slats of alkylbenzene sulfonic acids, such as salts of dodecylbenzene sulfonic acid; salts of polyoxyalkylene alkylether sulfonic acids, such as salts of polyoxyethylene 2-ethylhexyl ether sulfonic acids; salts of higher fatty acid amide sulfonic acids, such as salts of stearoyl methyltaurine, salts of lauroyl methyltaurine, salts of myristoyl methyltaurine and salts of palmitoyl methyltaurine; salts of N-acyl sarcosine acids, such as salts of lauroyl sarcosine acid; salts of alkyl phosphonic acids, such as salts of octyl phosphonate, salts of aromatic phosphonic acids, such as the potassium salt of phenyl phosphonate; salts of alkyl phosphonic acid alkyl phosphates, such as salts of 2-ethylhexyl phosphonate mono-2-ethylhexyl ester; salts of nitrogen-containing alkyl phosphonic acids, such as salts of aminoethyl phosphonic acid and its diethanol amine salt; salts of alkyl sulfates, such as salts of 2-ethylhexyl sulfate; salts of polyoxyalkylene sulfates, such as salts of polyoxyethylene 2-ethylhexyl ether sulfate; salts of long-chain sulfosuccinate salts, such as sodium di-2-ethylhexyl sulfosuccinate and sodium dioctyl sulfosuccinate; and long-chain N-acyl glutamates, such as monosodium N-lauroyl glutamate and disodium N-stearoyl-L-glutamate.

The cationic emulsifiers include, for example, quaternary ammonium salts, such as lauryltrimethyl ammonium chloride and oleylmethylethyl ammonium ethosulfate; and (polyoxyalkylene) alkylaminoether salts, such as (polyoxyethylene) lauryl aminoether lactate salt, stearyl aminoether lactate salt, and (polyoxyethylene) lauryl aminoether trimethyl phosphate salt.

The amphoteric emulsifiers include, for example, imidazoline amphoteric surfactants, such as sodium 2-undecyl-N, N-(hydroxyethyl carboxymethyl)-2-imidazolinate and disodium 2-cocoyl-2-imidazolinium hydroxyde-1-carboxyethyloxiate; betaine amphoteric surfactants, such as 2-heptadecyl-N-carb oxymethyl-N-hydroxyethyl imidazolium betaine, lauryldimethyl aminoacetic acid betaine, alkyl betaine, amidobetaine and sulfobetaine; and amino acid amphoteric surfactants, such as N-lauryl glycine, N-lauryl-.beta.-alanine and N-stearyl-.beta.-alanine.

Of those emulsifiers mentioned above, ionic surfactants can change with time in the emulsion of a precursor finish and can influence on the cross-linking performance of silicones. Thus nonionic emulsifiers are preferable for a finish composition owing to their stability through a storage period, minimum influence on silicone cross-linking performance and excellent performance to emulsify silicones.

Preferred emulsifiers are further described in U.S. Pat. No. 5,726,241. In particular, preferred emulsifiers may include nonionic emulsifiers, such as water-soluble POE alkyl ether, POE alkylaryl ether or POE fatty acid ester, or a mixture thereof. The weight ratio of the emulsifier in the finish composition of the present invention should preferably range from 1 to 40 wt %, more preferably from 5 to 30 wt %, and further more preferably from 8 to 25 wt %.

In one embodiment, the amount of emulsifier is from about 5 to 40 weight percent, based on the total weight of the composition, and in particular from 20 to 40 weight percent, and more particularly, from about 25 to 35 weight percent, based on the total weight of the composition.

4. Monocarboxylic Acids

In some embodiments, the finish composition may also include weakly acidic species, such as monocarboxylic acids having a $pK_{a1}$ greater than about 3.7, such as a $Pk_{a1}$ from 3.77 to 4.88. Such monocarboxylic acids are described in greater detail in U.S. Pat. No. 5,726,241. In one embodiment, the monocarboxylic acid comprises a lower aliphatic monocarboxylic acid of 6 carbon atoms or less. In the 247 patent, the monocarboxylic acid may be added to accelerate the emulsification of the polysiloxane. Examples monocarboxylic acids include formic acid, acetic acid, propionic acid, butyric acid, isobutyric acid, valeric acid, isovaleric acid, caproic acid, etc., or a hydroxycarboxylic acid of 4 carbon atoms or less, such as glycolic acid, lactic acid, etc. These monocarboxylic acids may be used either alone or as a mixture of 2 or more thereof.

5. Viscosity Modifiers

In some embodiments, the finish composition may include one or more viscosity modifiers. In general, the viscosity modifier includes any composition that desirable modifies the viscosity without inhibiting the effect of the present invention. In some embodiments, the viscosity modifier may comprise an aminocarboxylic material, such as carboxylic acid salts of alkylamines, carboxylic acid salts of arylamines, carboxylic acid salts of alkylarylamines, amino acids and betaine compounds. In a preferred embodiment, the viscosity modifier comprises β-alanine or 2-(Dibutylamino) ethanol acetate.

When present, the amount of viscosity modifier is from about 0.1 to 10 weight percent, based on the total weight of the finish composition, and in particular, from about 0.5 to 8 weight percent, and more particularly, from about 1 to 8 weight percent.

6. Additional Components

In addition to the above mentioned components, the finish composition of the present invention may further contain components so far as those components do not inhibit the effect of the present invention. Those components may include antioxidants, such as phenolic, amine, sulfur, phosphorus or quinone compounds; antistats, such as sulfate salts of higher alcohol or higher alcoholic ethers, sulfonate salts, phosphate salts of higher alcohol or higher alcoholic ethers, cationic surfactants of quaternary ammonium salts, and cationic surfactants of amine salts; lubricants, such as alkyl esters of higher alcohol, ethers of higher alcohol, and waxes; antibacterial agents; antiseptics; anticorrosive agents; and hygroscopic agents.

EXAMPLES

Tensile Strength

Tensile strengths of the carbon fiber samples were measured in accordance with the procedures set forth in ASTM D-4018.

Viscosity

All viscosity measurements were taken on emulsions containing 20% solids at 20° C. on a DV-I Prime viscometer (Brookfield) equipped with a constant temperature water bath.

pH

All pH readings the emulsions were taken with ab Accumet Basic pH meter (Fischer Scientific) equipped with temperature compensating probe.

Turbidities

Turbidities of 20% solid emulsions were measured on Hach 2100AN Turbidimeter (Hach USA) and were reported in NTU units.

Tow Property Evaluation

Figure 1:
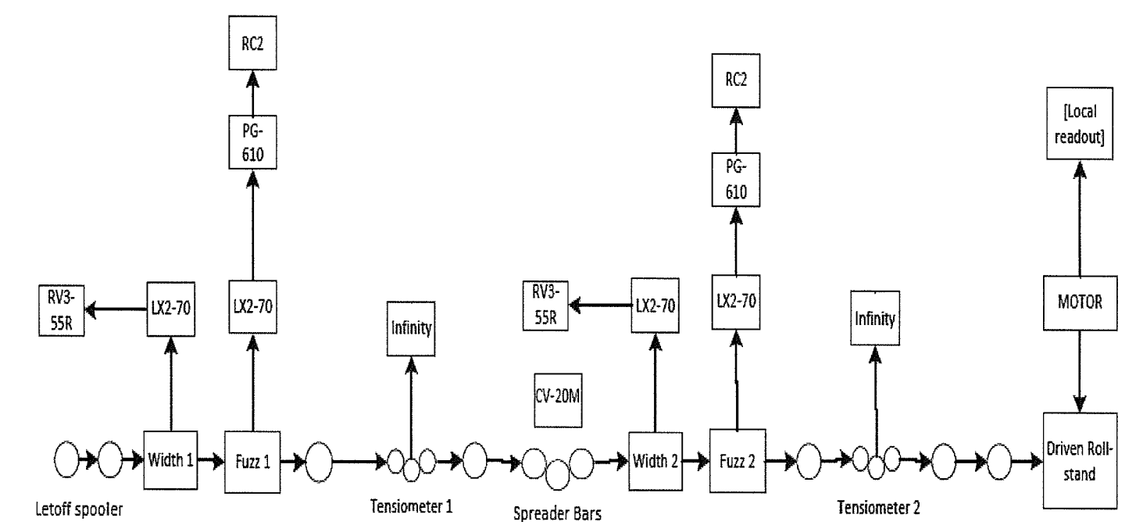
FIG. 1 shows a schematic representation of a Tow Evaluation Line used to evaluate tow properties (e.g., fuzz (broken filament count)).

Following carbonization, the carbon fibers were evaluated for fuzz (broken filament count). This evaluation was performed using the Tow Evaluation line, a representation of which is shown schematically in FIG. 1.

Fuzz:

Broken filament count (Fuzz 1 and Fuzz 2) was analyzed by laser occlusion. A piece of tape corresponding to the width of the tow was placed along the path of the tow on detectors "LX2-12" and nitrogen was blown at the rate of 30 cfph upwards just before the detector perpendicular to the fiber path. Detectors "LX2-12" were connected to amplifiers "LX2-70" and "PG-610" which were connected to "RC-2" counters, all manufactured by Keyence.

All results are based on 250 feet of fiber processed on Tow Evaluation line ran at 800 ft/hr. Measurements were taken every 3 sec.

Measurement of Aminosiloxane Finish Oil Content

A sample of the finish composition treated PAN precursor fiber was alkali-fused with potassium hydroxide/sodium butyrate and then dissolved in water, and the pH is adjusted to 1 with hydrochloric acid. To this was added sodium sulfite and ammonium molybdenate for color development, colorimetry (wavelength: 815 m t) was carried out with silica molybdenum blue to determine the silicon content. Using the value of this silicon content and the silicon content of crude amino-polysiloxane determined in advance by the same method, the polysiloxane content of the sample was calculated.

The materials used in the finish compositions are identified below. All percentages are weight percents unless indicated otherwise. All physical property and compositional values are approximate unless indicated otherwise.

"Emulsifier" refers to an ethoxylated tridecyl alcohol available from Ethox under the product name ETHAL® TDA-9.

The acetic acid (ACS Reagent Grade≥99%) was obtained from Sigma-Aldrich.

The oxamic acid (98%) was obtained from Acros Organics.

The fumic acid (99%) was obtained from Sigma-Aldrich.

The D,L-tartaric acid (DL-2,3-Dihydroxybutanedioic acid) (≥99%) was obtained from Sigma-Aldrich.

β-alanine (99%) was obtained from Sigma-Aldrich, and used as a viscosity modifier.

2-(dibutylamino)ethanol (99%) was obtained from Sigma-Aldrich. It was reacted with equimolar amount of acetic acid and the resulting product was used as viscosity reducing agent.

The polysiloxane used in the Examples was an amine-modified polysiloxane having a viscosity of 2100 cps, and an amine content of 14 mg KOH/g. The polysiloxane had the following structure:

The properties of the acids used in the Examples are summarized below in Table 1.

TABLE 1

| Acid properties | | |
|---|---|---|
| Acid | $pK_{a1}$ | Boiling/Decomposition point (° C.) |
| Acetic acid | 4.76 | 118 |
| DL-tartaric acid | 3.22 | 275 |
| Fumaric acid | 3.03 | 287 (decomp.) |
| Oxamic acid | 2.49 | 210 (decomp.) |
| L-Aspartic acid | 3.9 | 324 (decomp.) |

In the following examples, two different methods of preparing emulsions were utilized as set forth below.

Emulsification Procedure A: a silicone oil was prereacted with an organic acid at ambient temperature with agitation for 2 hours. A water solution of the emulsifier and any additional additives was then mixed with the silicone oil mixture at a temperature of 60° C. The combined mixture was mixed under high shear at a temperature of 58° C. for 1 hour.

Emulsification Procedure B: a water solution of the emulsifier, any additives, and organic acid were introduced into a mixer at a temperature of 60° C. Silicone oil was then slowly added to the mixture under higher shear at 58° C. for 1 hour.

The emulsion compositions were prepared in a PVM-2 mixer (Charles Ross & Son Co.) with temperature control.

Comparative Example 1

Comparative Example 1 was prepared in accordance with the teachings of U.S. Pat. No. 5,726,241. The finish composition of Comparative Example 1 was prepared by adding 3 parts of β-alanine to 102 parts of a 66/33/3 mixture of polyaminosiloxane/Ethal TDA-9 (C13EO10)/acetic acid. An aqueous emulsion of a 20 wt. % solids content was prepared with Emulsification Procedure A described above. The finish composition of Comparative Example 1 also served as the base formulation for Examples 1-5 to which a dicarboxylic acid was added at ambient temperature and stirred magnetically until dissolution.

Inventive Example 1

5 parts of the DL-tartaric acid was dissolved in the emulsion of Comparative Example 1.

Inventive Example 2

In Inventive Example 2, 3 parts of fumaric acid were dissolved into the emulsion of Comparative Example 1.

Inventive Example 3

In Inventive Example 4, 2 parts of oxamic acid were dissolved into the emulsion of Comparative Example 1.

Inventive Example 4

In Inventive Example 4, 3 parts of oxamic acid replaced the acetic acid in the formulation of Comparative Example 1. In addition, Emulsification Procedure B as described above was used in preparing the emulsions.

Comparative Example 2

Again, the emulsion composition of Comparative Example 2 was based on the emulsion composition described in U.S. Pat. No. 5,726,241. Comparative Example 2 served both as a control and a stock composition for the preparation of the emulsions of Examples 5-6. In examples 5-8 dicarboxylic acid was added to the formulation under ambient and stirred magnetically, until dissolved. The emulsions of Comparative Example 2 were prepared by adding 4.5 parts of dibutylethanolamine acetic acid salt to 102 parts of a 66/33/3 mixture of polyaminosiloxane/Ethal TDA-9 (C13EO10) as emulsifier/acetic acid. An aqueous emulsion of a 20 wt. % solids content was prepared with Emulsification Procedure A described above.

Inventive Example 5

Inventive Example 5 was prepared by dissolving 3 parts of fumaric acid into the emulsion composition of Comparative Example 2.

Inventive Example 6

Inventive Example 6 was prepared by dissolving 2 parts of oxamic acid into the emulsion composition of Comparative Example 2.

Inventive Example 7

In Inventive Example 7, 3 parts of Oxamic acid completely replaced the 2 parts of acetic acid in emulsion composition described in Comparative Example 2. In addition, Emulsification Procedure B as described above was used in preparing the emulsion.

Comparative Example 3

Again, the emulsion composition of Comparative Example 3 was based on the emulsion composition described in U.S. Pat. No. 5,726,241. Comparative Example 3 served both as a control and a stock composition for the preparation of the emulsions of Examples 8-9. In examples 8-9 dicarboxylic acid was added to the formulation under ambient and stirred magnetically, until dissolved. The emulsions of Comparative Example 3 were prepared by adding 4.5 parts of dibutylethanolamine acetic acid salt to 104 parts of a 66/33/3/2 mixture of polyaminosiloxane/Ethal TDA-9 (C13EO10) as emulsifier/acetic acid/AO-26 antioxidant (Adeka Corp.). An aqueous emulsion of a 20 wt. % solids content was prepared with Emulsification Procedure A described above.

Inventive Example 8

Inventive Example 8 was prepared by dissolving 3 parts of fumaric acid into the emulsion composition of Comparative Example 3.

Inventive Example 9

Inventive Example 9 was prepared by dissolving 3 parts of L-Aspartic acid into the emulsion composition of Comparative Example 3.

Inventive Example 10

In Inventive Example 10, 2.2 parts of L-Aspartic acid completely replaced the 3 parts of acetic acid in emulsion composition described in Comparative Example 3. In addition, Emulsification Procedure B as described above was used in preparing the emulsion.

The properties of the Emulsions of Comparatives Examples 1-3 and Inventive Examples 1-10 were then evaluated. The results are summarized in Table 2 below.

TABLE 2

Emulsion Properties

| Example No. | Emulsification Procedure | pH | Viscosity (cps) | Turbidity |
|---|---|---|---|---|
| Comparative Example 1 | A | 4.5 | 5.9 | 50.4 |
| Inventive Example 1 | A | 3.6 | 3.1 | 68.0 |
| Inventive Example 2 | A | 3.8 | 3.2 | 84.8 |
| Inventive Example 3 | A | 3.9 | 3.7 | 79.4 |
| Inventive Example 4 | B | 3.8 | 3.6 | 126 |
| Comparative Example 2 | A | 4.5 | 3.5 | 49.6 |
| Inventive Example 5 | A | 3.7 | 3.2 | 82.8 |
| Inventive Example 6 | A | 3.7 | 3.5 | 61.9 |
| Inventive Example 7 | B | 3.8 | 3.3 | 119 |
| Comparative Example 3 | A | 4.5 | 3.5 | 55 |
| Inventive Example 8 | A | 3.7 | 3.2 | 75 |
| Inventive Example 9 | A | 4.0 | 3.6 | 62 |
| Inventive Example 10 | B | 5.9 | 3.4 | 132 |

The performance of the emulsions of Comparative Examples 1-3 and Inventive Examples were then evaluated during the carbonization process. As discussed below, tows of PAN precursor fibers were coated with the emulsions, and then passed through oxidation and carbonization furnaces to produce carbon fibers. The process of preparing the PAN precursor fibers are discussed below.

The polyacrylonitrile (PAN) precursor fibers used in the examples were prepared as follows. The fibers were made from a copolymer comprising 98 mol % acrylonitrile and 2% methacrylic acid by air gap wet spinning. A single tow pilot spinning line was employed. The spinning and coagulant solutions were based on an aqueous sodium thiocyanate. The fibers were stretched during spinning compared to their length after extrusion from the spinnerets.

The precursor fibers were bundled in tows of 3,000 (3K) filaments per tow, with filament deniers of 1.3 dpf. The tows were then passed through a bath comprising a 5.5 wt. % aqueous emulsion of finish compositions described above (Comparative Examples 1-2 and inventive Examples 1-7) in which immersed kiss rolls applied the finish composition. The fibers were then dried on dryer rolls, and contained about 1 wt. % of the finish composition.

In Examples 1-4 and Comparative Example 1, 1.5 kg (fiber weight) spools of 3K precursor fibers were converted into carbon fibers by Hexcel proprietary procedure on a pilot carbon fiber line. The resulting fiber tows were not surface treated. At the last stage all fibers were sized with Hexcel's proprietary G-size. The amount of the size on all fibers was 1 wt. %. The fibers were than subjected to tensile testing and tow property evaluation.

In examples 5-10 and Comparative Examples 2-3, 20 kg (fiber weight) spools of 3K precursor fibers were converted into carbon fibers by Hexcel proprietary procedure on a Production line. The resulting fiber tows were surface treated. At the last stage all fibers were sized with Hexcel's proprietary G-size. The amount of the size on all fibers was 1 wt. %. Results are summarized in Table 3.

TABLE 3

Carbon Fiber Properties

| Example No. | Finish Oil Content on Precursor Fiber (%) | UTS (ksi) | Fuzz 1 | Fuzz 2 | Broken Filament Count |
|---|---|---|---|---|---|
| Comparative Example 1 | 1.08 | 623 | 16 | 26 | 42 |
| Inventive Example 1 | 0.93 | 642 | 4 | 1 | 5 |
| Inventive Example 2 | 0.83 | 630 | 9 | 8 | 17 |
| Inventive Example 3 | 1.00 | 635 | 18 | 7 | 25 |
| Inventive Example 4 | 0.89 | 612 | 5 | 3 | 8 |
| Comparative Example 2 | 1.02 | 714 | 259 | 230 | 489 |
| Inventive Example 5 | 0.81 | 685 | 14 | 8 | 22 |
| Inventive Example 6 | 1.09 | 681 | 11 | 14 | 25 |
| Inventive Example 7 | 0.89 | 678 | 52 | 17 | 69 |
| Comparative Example 3 | 0.97 | 652 | 85 | 88 | 173 |
| Inventive Example 8 | 0.92 | 651 | 27 | 41 | 68 |
| Inventive Example 9 | 0.98 | 645 | 30 | 30 | 60 |
| Inventive Example 10 | 0.83 | 679 | 37 | 49 | 86 |

From Table 3, it can be seen that while the measured tensile strengths of the carbon fiber did not fluctuate significantly between the Comparative and Inventive Examples, the difference between the measured fuzz and broken filaments was significant. In particular, Inventive Examples 1-5 exhibited an average Fuzz 1 of 9 in comparison to a Fuzz 1 value of 16 for Comparative Example 1. This is a percent decrease in Fuzz 1 of 43.8%. These results are improved further if the results of Inventive Example 3 are not included as this value appears to be an outlier. In that case, the average Fuzz 1 based on Inventive Examples 1, 2 and 5 is 6, which is a 62.5% decrease in Fuzz 1. With respect to Fuzz 2 values, the difference is even more significant. The average Fuss 2 values for Inventive Examples 1-4 is 4.75 in comparison to a Fuzz 2 value for Comparative Example 1 of 26. This is a percent difference of 81.7%. With respect to the comparison of Inventive Examples 5-7 to Comparative Example 2, the differences in Fuzz values is even more pronounced.

In addition, the broken filament count of the Inventive Examples is also significantly improved in comparison to the Comparative Examples. Inventive Examples 1-4 had an average broken filament count of 13.8 whereas the broken filament count for Comparative Example 1 is 42, which resulted in a decrease in broken filament count of 67.1%. With respect to the comparison of Inventive Examples 5-7 to Comparative Example 2, the differences in broken filament counts is even more pronounced.

In Inventive Examples 8-10, it can be seen that the inventive finish composition provides improvements in broken filament count and Fuzz in comparison to Comparative Example 3, which did not include a dicarboxylic acid. While not as pronounces as the earlier examples, the improvement in fiber performance is still significant.

Thus, it can be seen that the inclusion of the dicarboxylic acids having molecular weights less than 1,000 g/mol, boiling/decomposition temperatures from 200 to 400° C., and $pK_a$ of less than 4 significantly improved the performance of the carbon fibers in comparison to the finish compositions that did not include the dicarboxylic acids.

What is claimed:

1. A finish composition comprising:
An amino-modified polysiloxane of general formula:

wherein $R_2$ is a hydrogen atom, a lower alkyl group or an aryl group; $R_3$ and $R_4$ are each a lower alkyl group or an aryl group; $R_5$ is a hydrogen atom or a group of wherein $R_8$ and $R_9$ are each a lower alkyl group and $R_{10}$ is a hydrogen atom, a lower alkyl group or amine substituted lower alkyl group; $R_6$ and $R_7$ are each a hydrogen atom, a lower alkyl group or amine substituted lower alkyl group; and A is an alkylene group containing 2 to 5 carbon atoms or phenylene group, and x and y are positive integers which provide a molecular weight of the aminosiloxane of not more than 100,000;
an emulsifier;
water;
a dicarboxylic acid having a $pK_a$ from about 1 to about 4, and a boiling or decomposition point from 200 to 400° C., wherein the dicarboxylic acid has the following formula:

wherein $R_1$ is either absent or a saturated or unsaturated, linear or branched, aromatic, substituted or unsubstituted, hydrocarbon group; and wherein $R_1$ does not include an amine or amide group; and a compound selected from the group consisting of (i) an amino acid; and (ii) 2-(dibutylamino)ethanol acetate;
wherein the amount of polysiloxane in the composition is from about 50 to 90 weight percent based on the total weight of the composition; and
wherein the amount of the emulsifier in the composition is from about 8 to 35 weight percent based on the total weight of the composition.

2. The finish composition according to claim 1, further comprising a monocarboxylic acid having a $pK_a$ greater than 3.7.

3. The finish composition according to claim 2, wherein the monocarboxylic acid is selected from the group consisting of formic acid, acetic acid, propionic acid, butyric acid, isobutyric acid, valeric acid, isovaleric acid, caproic acid, and a hydroxycarboxylic acid of 4 carbon atoms or less.

4. The finish composition of claim 1, wherein the composition comprises β-alanine, glutamic acid, or a mixture thereof.

5. The finish composition of claim 1, wherein the composition comprises 2-(Dibutylamino)ethanol acetate.

6. The finish composition of claim 1, wherein $R_1$ is selected from the group consisting of:
a saturated, branched alkyl chain having 2 to 4 carbon atoms;
a linear alkyl chain substituted with one or more of, oxygen, sulfur or phosphorus containing groups, and the number of carbon atoms in the linear alkyl chain is up to 6; and
an aromatic group that is optionally substituted with one or more of an alkyl group having 1 to 6 carbon atoms, an oxygen containing group, a sulfur containing group, or a phosphorous containing group.

7. The finish composition of claim 1, wherein $R_1$ includes one or more of:
one or more polyethylene or polypropylene glycol groups; or
one or more of an alkene, alkyne, alcohol, carbonyl, ether, phenyl, benzene, furan, or pyran group.

8. The finish composition of claim 1, wherein the dicarboxylic acid has a $pK_a$ from about 2 to 3.5.

9. The finish composition of claim 1, wherein the dicarboxylic acid has a molecular weight from about 100 to 600 g/mol, and a boiling or decomposition point from 200 to 350° C.

10. The finish composition of claim 1, wherein $R_1$ includes one or more of an alkene, alkyne, alcohol, carbonyl, ether, phenyl, benzene, furan, or pyran group.

11. The finish composition of claim 1, wherein the dicarboxylic acid or derivative thereof is selected from the group consisting of DL-Tartaric acid, L-Tartaric acid, D-Tartaric acid, fumaric acid, mesaconic acid, succinic acid, 2-methyl succinic acid, L-malic acid, DL-malic acid, D-malic acid, mesoxalic acid, muconic acid, oxaloacetic acid, diglycolic acid, 2,2'-oxydipropanoic acid, 3,3'-oxydipropanoic acid, 2,2'-[1,2-ethanediylbis(oxy)]bis-acetic acid, 3,3'-[1,2-ethanediylbis(oxy)]bis-propanoic acid, 3,3'-[oxybis(ethane-2,1-diyloxy)]dipropanoic acid, poly(ethylene glycol)bis-acetic acid, polyethylene glycol bis(carboxymethyl) ether, polyethylene glycol diacid 600, chelidonic acid, 2,5-furandicarboxylic acid, isophthalic acid, terephthalic acid, orthophthalic acid, trimesic acid, 1,4-phenylene diacetic acid, and 1,3-phenylene diacetic acid.

12. The finish composition of claim 1, wherein the amount of the polysiloxane in the composition is from about 60 to 80 weight percent based on the total weight of the composition.

13. The finish composition of claim 1, wherein the emulsifier is nonionic, a water-soluble POE alkyl ether, POE alkylaryl ether or POE fatty acid ester, or a mixture thereof.

14. The finish composition of claim 1, wherein the amount of the emulsifier in the composition is from about 25 to 35 weight percent based on the total weight of the composition.

15. A fiber comprising polyacrylonitrile and having a finish coating according to claim 1, applied to a surface thereof.

16. A method of preparing a treated fiber comprising the steps of:
applying a finish composition in accordance with claim 1 to a polyacrylonitrile based fiber to form a coating thereon.

17. The method of claim 16, further comprising the step of carbonizing the fiber to form a carbon fiber.

18. The finish composition of claim 1, wherein the dicarboxylic acid is selected from the group consisting of DL-Tartaric acid, L-Tartaric acid, D-Tartaric acid, fumaric acid, mesaconic acid, succinic acid, 2-methyl succinic acid, L-malic acid, DL-malic acid, D-malic acid, mesoxalic acid, muconic acid, oxaloacetic acid, diglycolic acid, chelidonic acid, 2,5-furandicarboxylic acid, 3,3'-oxydipropanoic acid and 2,2'-[1,2-ethanediylbis(oxy)]bis acetic acid.

19. The finish composition of claim 1, wherein the dicarboxylic acid is selected from the group consisting of DL-Tartaric acid, L-Tartaric acid, D-Tartaric acid, fumaric acid, and mesaconic acid.

20. The finish composition of claim 1, wherein the dicarboxylic acid is fumaric acid.

21. The finish composition of claim 1, wherein the dicarboxylic acid is muconic acid.

22. The finish composition of claim 1, wherein the dicarboxylic acid is succinic acid.

* * * * *